(12) United States Patent
Azami et al.

(10) Patent No.: US 6,644,863 B1
(45) Date of Patent: Nov. 11, 2003

(54) ANGLED OPTICAL FIBER CONNECTOR

(75) Inventors: Kazuo Azami, Saitama (JP); Yukio Kaneko, Kanagawa (JP); Hiromu Yorozu, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/647,024
(22) PCT Filed: Mar. 3, 2000
(86) PCT No.: PCT/JP00/01244
§ 371 (c)(1), (2), (4) Date: Sep. 26, 2000
(87) PCT Pub. No.: WO00/54085
PCT Pub. Date: Sep. 14, 2000

(30) Foreign Application Priority Data

Mar. 9, 1999 (JP) .......................................... 11-061056

(51) Int. Cl.⁷ ................................................ G02B 6/40
(52) U.S. Cl. ......................................... 385/54; 385/139
(58) Field of Search ............................ 385/53, 54, 115, 385/116, 136, 137, 139

(56) References Cited

U.S. PATENT DOCUMENTS

| 4,869,686 | A | * | 9/1989 | Michaels et al. | 439/455 |
| 4,986,622 | A | * | 1/1991 | Martinez | 385/126 |
| 5,570,443 | A | * | 10/1996 | May et al. | 385/75 |
| 5,734,773 | A | * | 3/1998 | Teshima et al. | 385/126 |
| 5,785,403 | A | * | 7/1998 | Chang | 353/42 |
| 5,832,159 | A | * | 11/1998 | Davis | 385/53 |
| 6,012,950 | A | * | 1/2000 | Vanbesien | 439/610 |
| 6,130,983 | A | * | 10/2000 | Cheng | 385/139 |
| 6,179,476 | B1 | * | 1/2001 | Besler et al. | 385/53 |

* cited by examiner

Primary Examiner—Lynn Feild
Assistant Examiner—Son V. Nguyen
(74) Attorney, Agent, or Firm—Jay H. Maioli

(57) ABSTRACT

An optical fiber connector is comprised of an optical cable and a pair of plugs connected to input and output end portions of the optical cable. A multi-fiber core employed in the optical fiber cable is constituted by a plurality of fiber cores. The input and output end portions of the optical cable are bent at an angle of about 90 while having a bent radius at the bent top portion.

6 Claims, 18 Drawing Sheets

ANGLED OPTICAL FIBER CONNECTOR

FIELD OF THE INVENTION

The present invention relates to an optical fiber connector employed in connecting audio-visual devices with each other for optical communication.

BACKGROUND OF THE INVENTION

Various optical fiber connectors have been proposed and in practical use. FIG. 18 shows a conventional plastic optical fiber connector 601 which is constituted by an optical cable 602, input and output plugs 603 and 604 installed respectively to input and output end portions 602a and 602b of the optical cable 602. The plastic optical fiber connector 601 is employed in connecting electronic devices 701 and 703 by inserting the input plug 603 into an input jack 702 of the electronic device 701 and by inserting the output plug 604 into an output jack 704 of the electronic device 703. As shown in FIGS. 19 and 20, the optical cable 602 is constituted by a single-fiber core 611 and a covering layer 612 which covers an outer periphery of the single-fiber core 611. The single-fiber core 611 is made of plastic and functions as a signal transmitting medium. An outer peripheral portion of the single-fiber core 611 is covered with a cladding 613. In other words, the cladding 613 is provided between the single-fiber core 611 and the covering layer 612. The covering layer 612 is made of plastic superior in durability so as to protect the single-fiber core 611 and the cladding 613. In order to connect the electronic devices 701 and 702 by means of the optical connector 601, the end portions of the optical cable 602 are set straight, and the plugs 603 and 604 are inserted to the jacks 702 and 704 of the input and output sides of the electronic devices 701 and 703, respectively.

SUMMARY OF INVENTION

However, the above-mentioned plastic optical fiber connector 601 has had the following problems. (1) Since an allowable bent radius R of the optical cable 602 is large (about 20 mm), it is difficult to use a so-called bent-type plug which is used by perpendicularly bending the input and output end portions of the optical cable 602. Therefore, it is necessary to use a straight-type plug when such an optical cable 602 is employed. (2) Even when the straight-type plug is used, the allowable bent radius R of the optical cable 602 is still large such as about 20 mm. Therefore, it is necessary to provide a relatively large arrangement space S as shown in FIG. 21 in order to ensure the allowable bent radius R for the optical cable connector 601. This restricts degree of freedom as to wiring of the optical cable 602.

The inventors of the present invention found that an allowable radius of an optical cable employing a multi-fiber core was smaller than an optical cable employing a single-fiber core. On the basis of the result, the present invention has been achieved so that the optical fiber connector according to the present invention solves the conventional problems by employing a multi-fiber core to the optical cable.

An aspect of the present invention resides in an optical fiber connector which comprises an optical cable employing a multi-fiber core constituted by a plurality of plastic fibers, and a pair of plugs installed to both end portions of the optical cable.

With this arrangement, it becomes possible to utilize the optical fiber connector in a condition that the optical cable is bent at a desired angle while decreasing its allowable bent radius at a smaller radius.

DESCRIPTION OF THE INVENTION

Referring to FIGS. 1 to 11, there is shown a first embodiment of a plastic optical fiber connector 1 according to the present invention.

Figure 1:
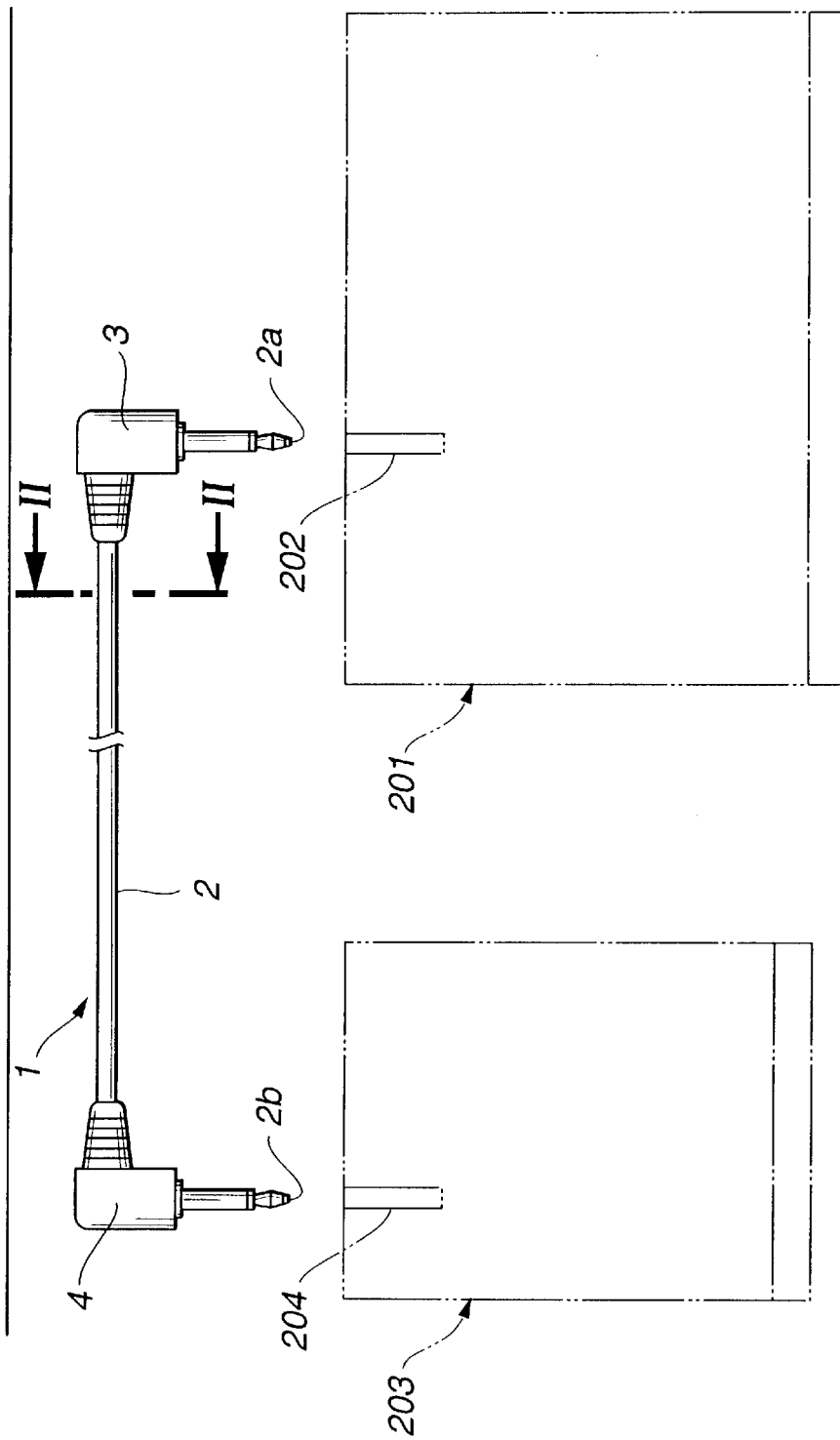
FIG. 1 is a general view showing a first embodiment of a plastic optical fiber connector according to the present invention, together with electronic devices connected by this connector.

As shown in FIG. 1, the plastic optical fiber connector 1 comprises an optical cable 2 and plugs 3 and 4 of input and output end portions respectively installed to input and output end portions 2a and 2b of the optical cable 2. The plastic optical fiber connector 1 is arranged to connect an input side of an electronic device 201 and an output side of an electronic device 203 by inserting the input end portion side plug 3 to an input side jack 202 of the electronic device 201 and by inserting the output end portion side plug 4 to an output side jack 204 of the electronic device 203.

Figure 2:
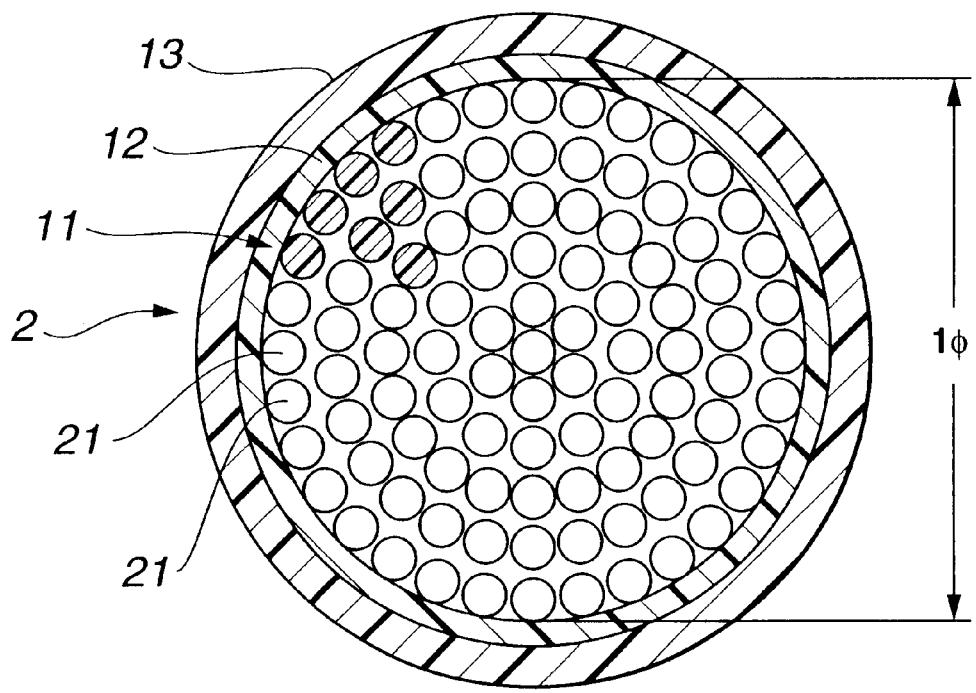
FIG. 2 is a cross-sectional view of a fiber cable of the plastic optical fiber connector of FIG. 1, taken in the direction of arrows substantially along the line II—II of FIG. 1.
Figure 3:
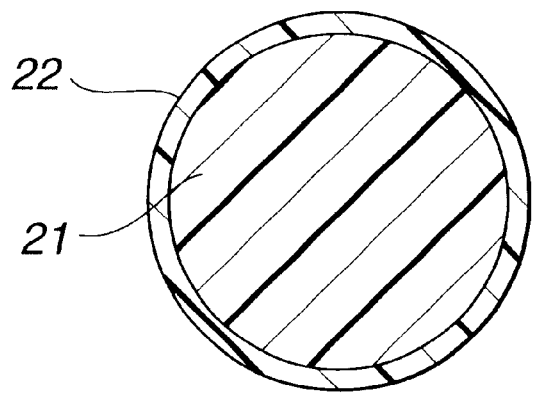
FIG. 3 is a cross-sectional view of one fiber of a multi-fiber core of the first embodiment.
Figure 4:
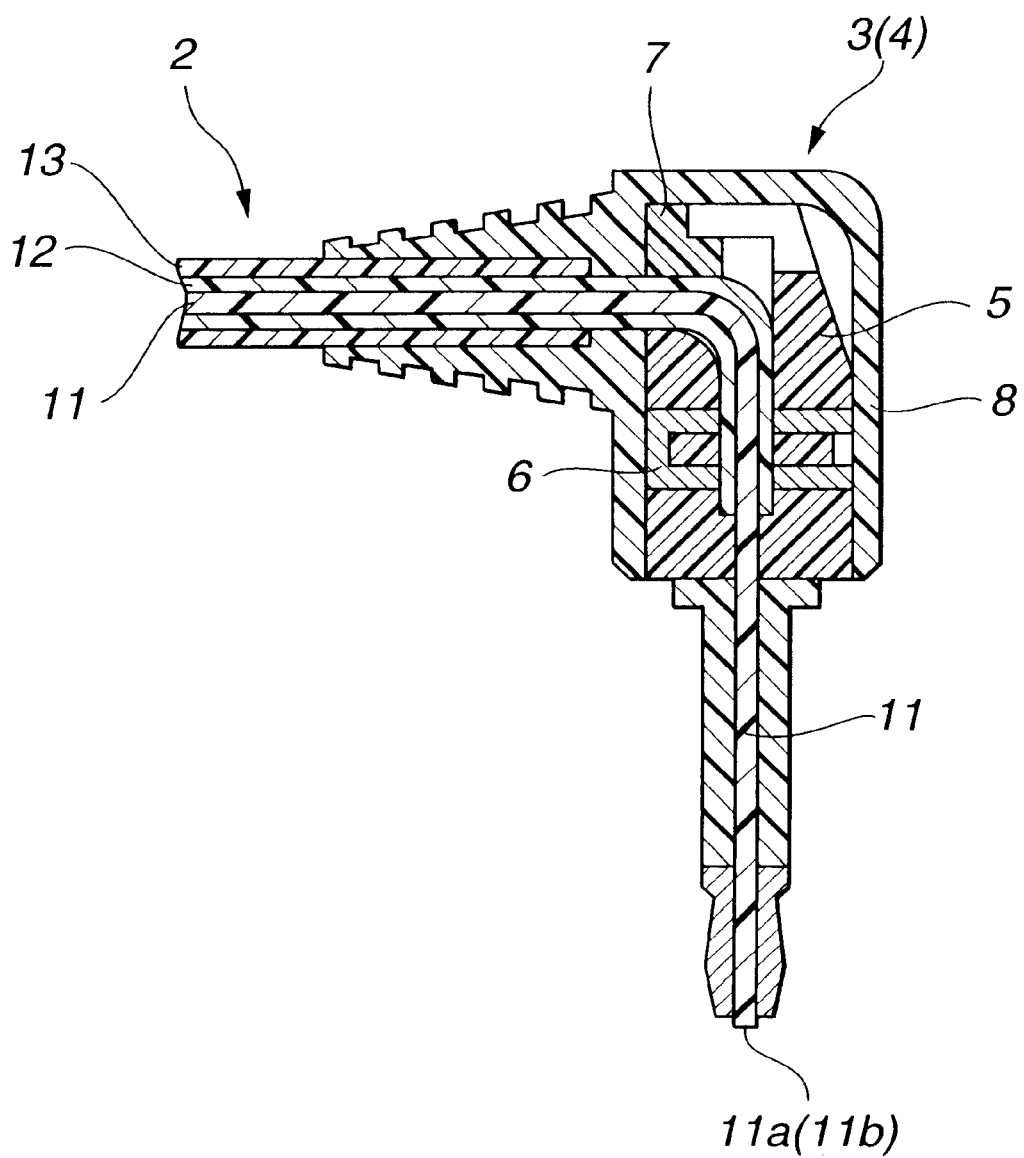
FIG. 4 is a cross-sectional view of a plug of the first embodiment.
Figure 5:
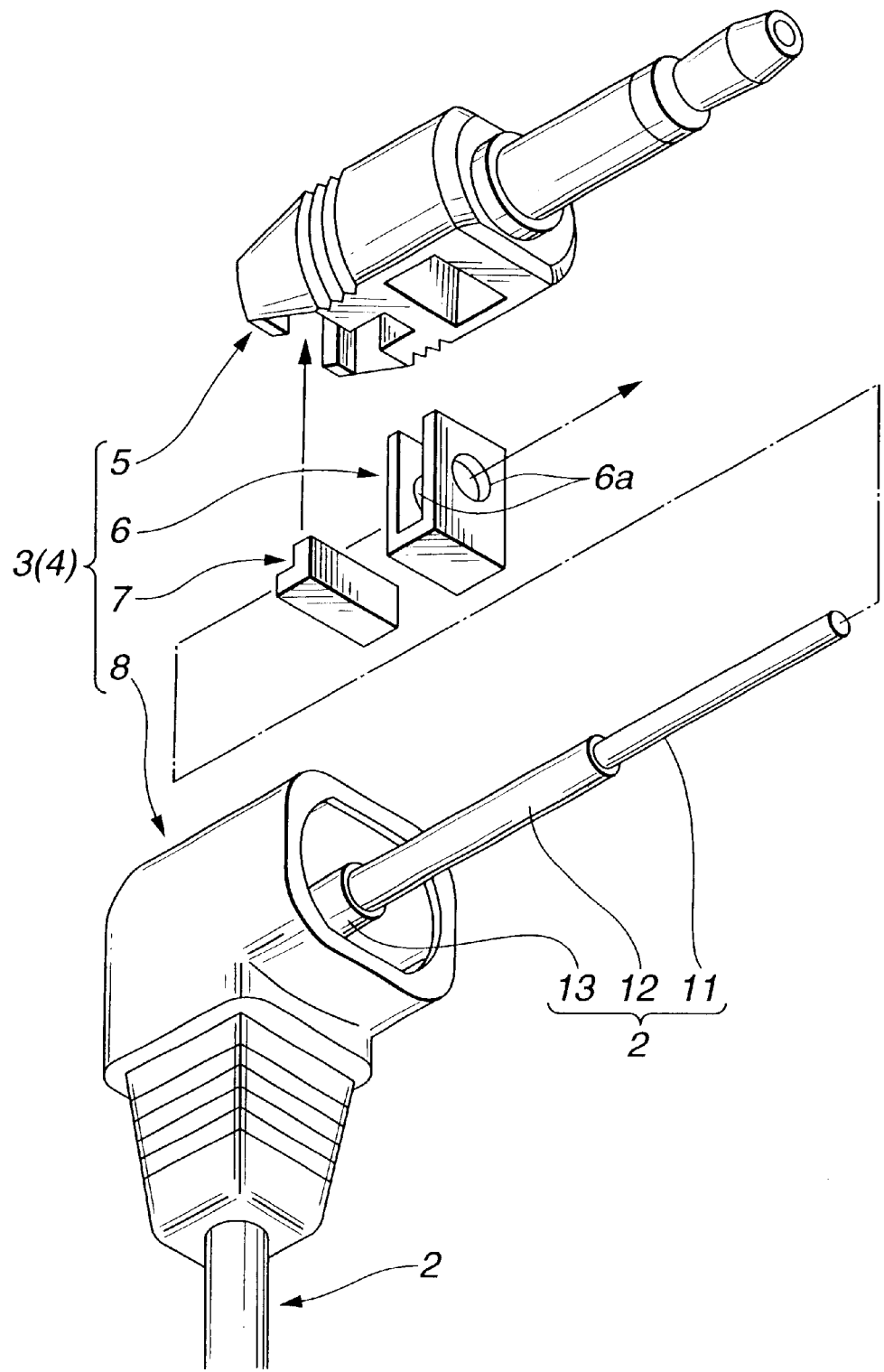
FIG. 5 is an exploded perspective view of the plug of FIG. 4.

As shown in FIG. 2, the optical cable 2 comprises a multi-fiber core 11 and first and second covering layer 12 and 13 which cover an outer periphery of the multi-fiber core 11. The multi-fiber core 11 is formed by combining two hundreds and several tens of core fibers 21 into a bundle of 1 mm diameter (1φ). The multi-fiber core 11 is made of plastic and functions as a signal transmitting medium. As shown in FIG. 3, each of the core fibers 21 is covered with cladding 22. As shown in FIGS. 1 and 4, both end portion of the optical cable 2 are bent at an angle of about 90° by the plugs 3 and 4, respectively. Each of the plugs 3 and 4 comprises a plug main body 5, a cable stopper member 6, a cable bent maintaining member 7 and a cover member 8, as shown in FIG. 5.

The assembly of the plugs 3 and 4 to the optical cable 2 is executed by the following steps.

Figure 6A:
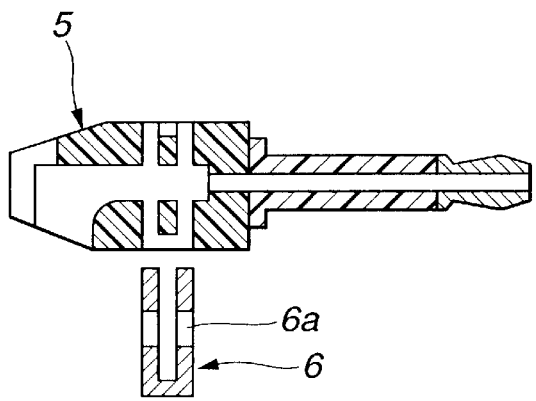
FIGS. 6A to 6D are cross-sectional views showing assembly process of the plug of FIG. 4.
Figure 6B:
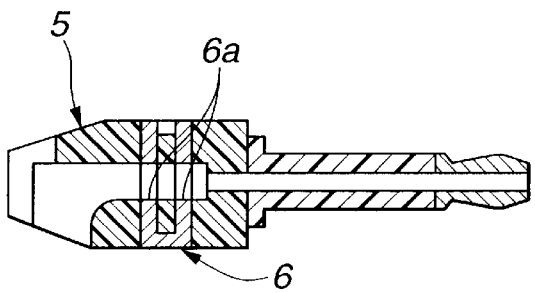
Figure 6C:
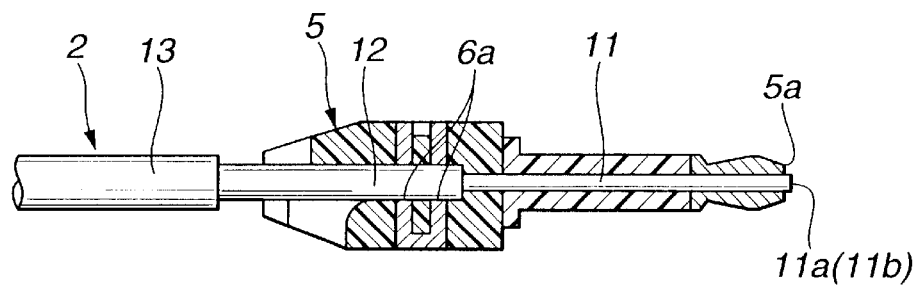
Figure 6D:
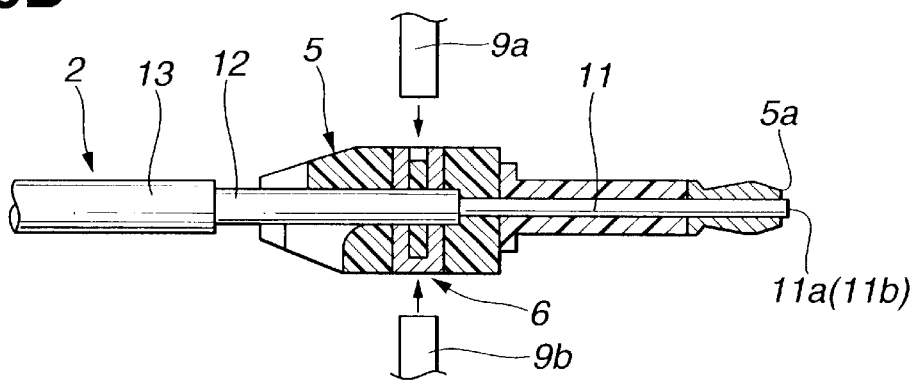

As shown in FIGS. 6A and 6B, the cable stopper member 6 is installed to the plug main body 5 of each of the plugs 3 and 4. Next, as shown in FIG. 6C, the optical cable 2 is inserted from a back side of the plug main body 5, and cable insertion holes 6a provided to the cable stopper member 6 are penetrated by the optical cable 2. Thereafter, each of the input and output end portions 11a and 11b of the multi-fiber core 11 of the optical cable 2 is set so as to slightly project from a tip end surface 5a of the plug main body portion 5. Further, as shown in FIG. 6D, the cable insertion hole 6a is pressingly deformed by pressing the cable stopper member 6 by means of a punch 9a and a die 9b in order to prevent the optical cable 2 from being detached from the plug main body portion 5.

Figure 7A:
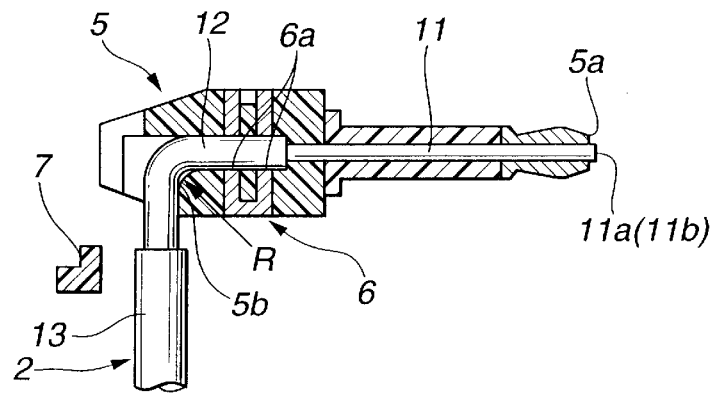
FIGS. 7A to 7C are cross-sectional views showing assembly process of the plug of FIG. 4.
Figure 7B:
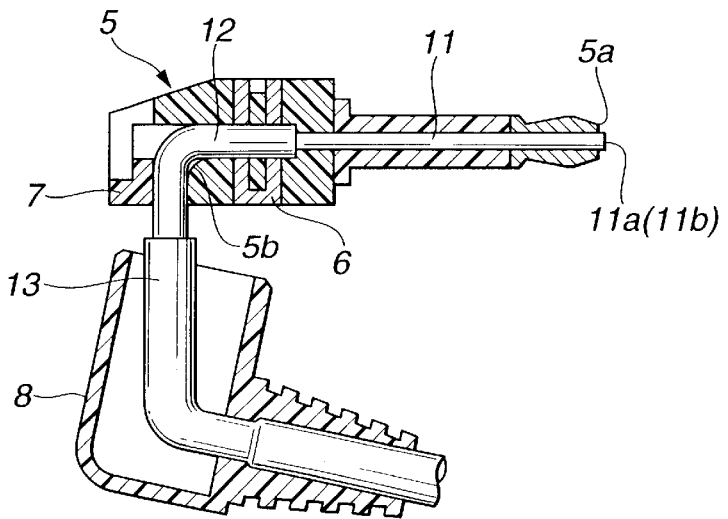
Figure 7C:
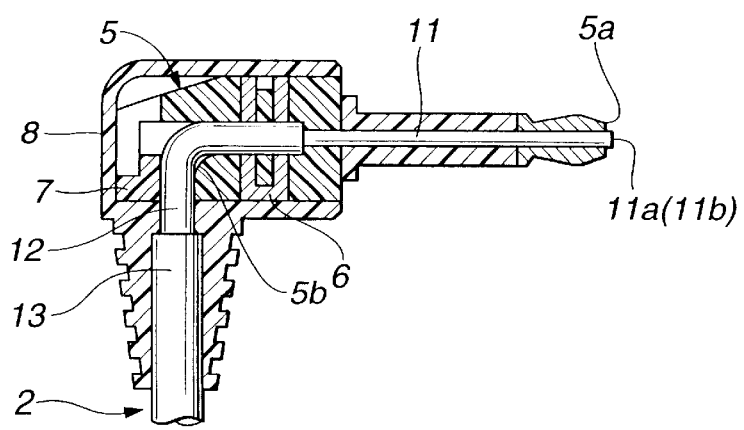

Following to the assembly steps shown in FIGS. 6A to 6D, the optical cable 2 in the plug main body 5 is bent along a cable bent surface 6a provided in the plug main body 5 at a radius R of about 3 mm, as shown in FIG. 7A. Next, the optical cable 2 is maintained at a bent angle of 90° by installing the cable bent maintaining member 7 to the plug main body 5, as shown in FIG. 7B. Thereafter, the cover member 8 is installed to the plug main body 5, as shown in FIG. 7C.

By executing the assembly steps shown in FIGS. 6A–6D and 7A–7C, the plugs 3 and 4 are rightly installed to the optical cable 2, and the both end portions of the optical cable 2 are maintained at a bent angle of about 90° by these plugs 3 and 4, respectively.

Figure 8:
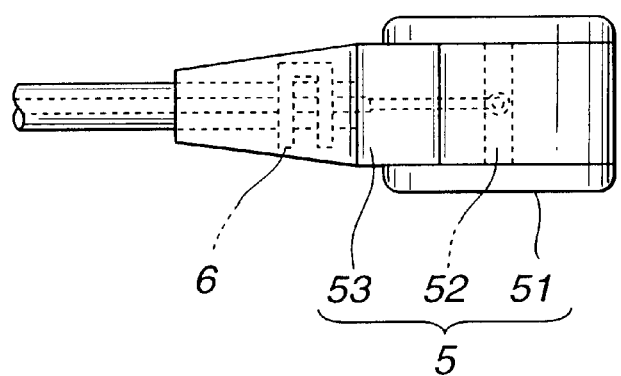
FIG. 8 is a front view showing a modification of the plug of the first embodiment.
Figure 9:
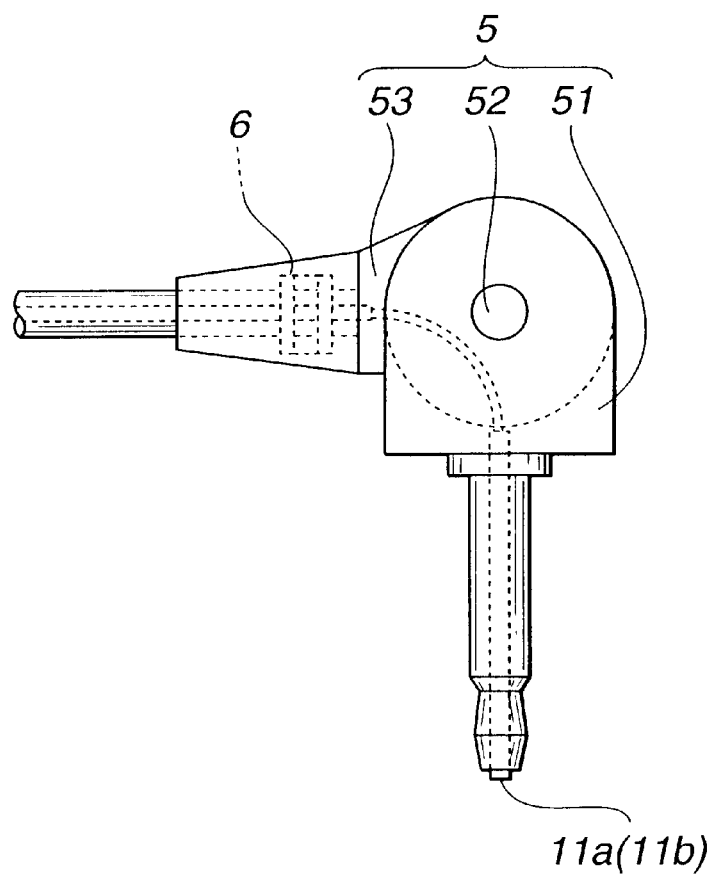
FIG. 9 is a side view showing the plug of FIG. 8.
Figure 10:
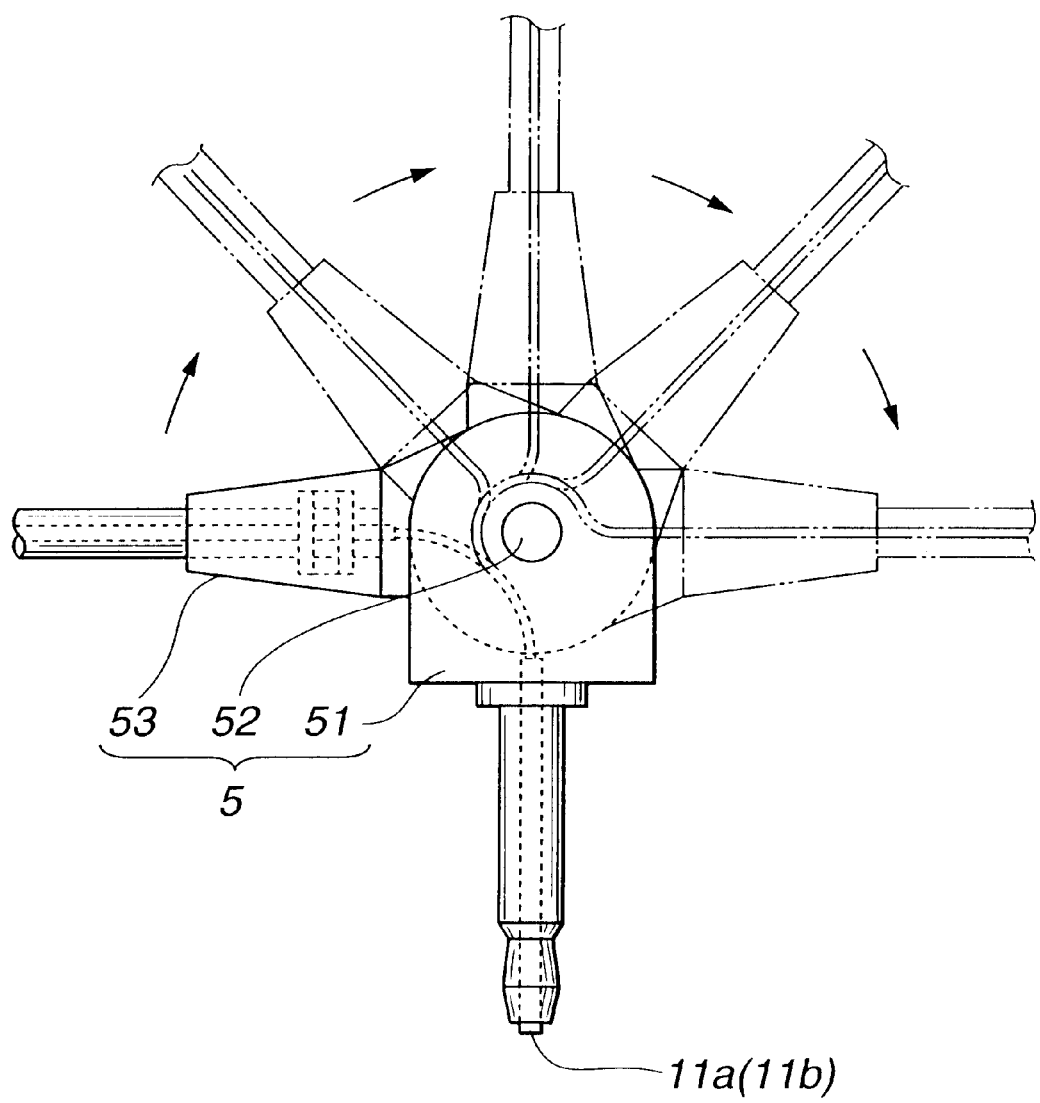
FIG. 10 is a side view explaining an angle variable function of the plug of FIG. 8.

Although the first embodiment has been shown such that the input and output end portions of the optical cable 2 is bent at an angle of about 90° by the plugs 3 and 4 while forming the bent curve of 3R, it may be bent into a predetermined angle, such as 45°, 135 ° or 180° angle. More specifically, the plug 3, 4 may be modified as shown in FIGS. 8 and 9. That is, the plug main body 5 may be constituted by a fixed portion 51 and a rotatable portion 53 which is movable on a shaft 52 with respect to the fixed portion 51 and lockable at a predetermined rotation angle. This enables the input and output end portions of the optical cable 2 to be bent at a desired angle such as 0°, 45°, 90°, 135° or 180° angle, as shown in FIG. 10.

Figure 11:
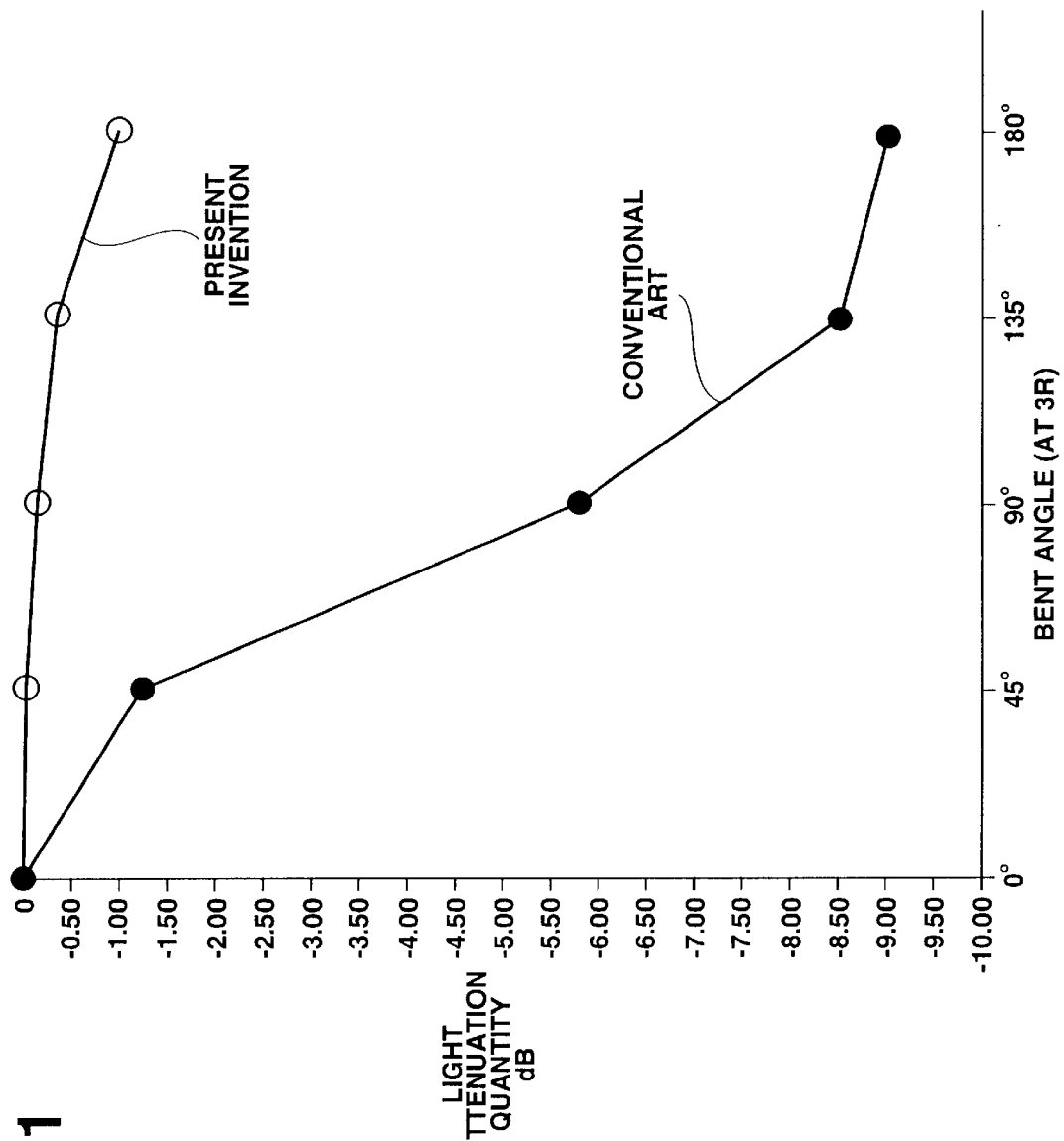
FIG. 11 is a graph showing a relationship between a light attenuation quantity and a bent angle of the optical cable employed in the first embodiment.

When the optical cable 2 employing the multi-fiber core 11 was bent at angles of 45°, 90°, 135° and 180° while forming a bent curve of 3R, light attenuation quantities at the respective bent angles as compared with that of a straight condition took preferable values as shown in FIG. 11 and Table 1. As is clear from a graph of FIG. 11 and Table 1, even in a case of the bent angle of 135°, the light attenuation quantity thereof was very small and was negligible in practical use. In contrast to this results of the present invention, when the conventional optical cable 602 employing a single-fiber core 611 of 1φ was bent at angles of 45°, 90°, 135° and 180° while forming a bent curve of 3R, the light attenuation quantities of the respective bent angles became large as shown in FIG. 11 and Table 1. For example, the light attenuation quantity of the bent angle of 45° of the conventional optical cable 602 was larger than that of the bent angle 180° of the optical cable 2 employing the multi-fiber core 11. This apparently proves the superior performance of the optical fiber 2 according to the present invention.

TABLE 1

| Bent Angle Optical Cable | Reference (0°) | 45° | 90° | 135° | 180° |
| --- | --- | --- | --- | --- | --- |
| Present Invention | 0 dB | −0.01 dB | −0.12 dB | −0.28 dB | −0.94 dB |
| Conventional Art | 0 dB | −1.24 dB | −5.75 dB | −8.51 dB | −9.01 dB |

Referring to FIGS. 12 to 15, there is shown a second embodiment of the plastic optical fiber connector according to the present invention.

Figure 12:
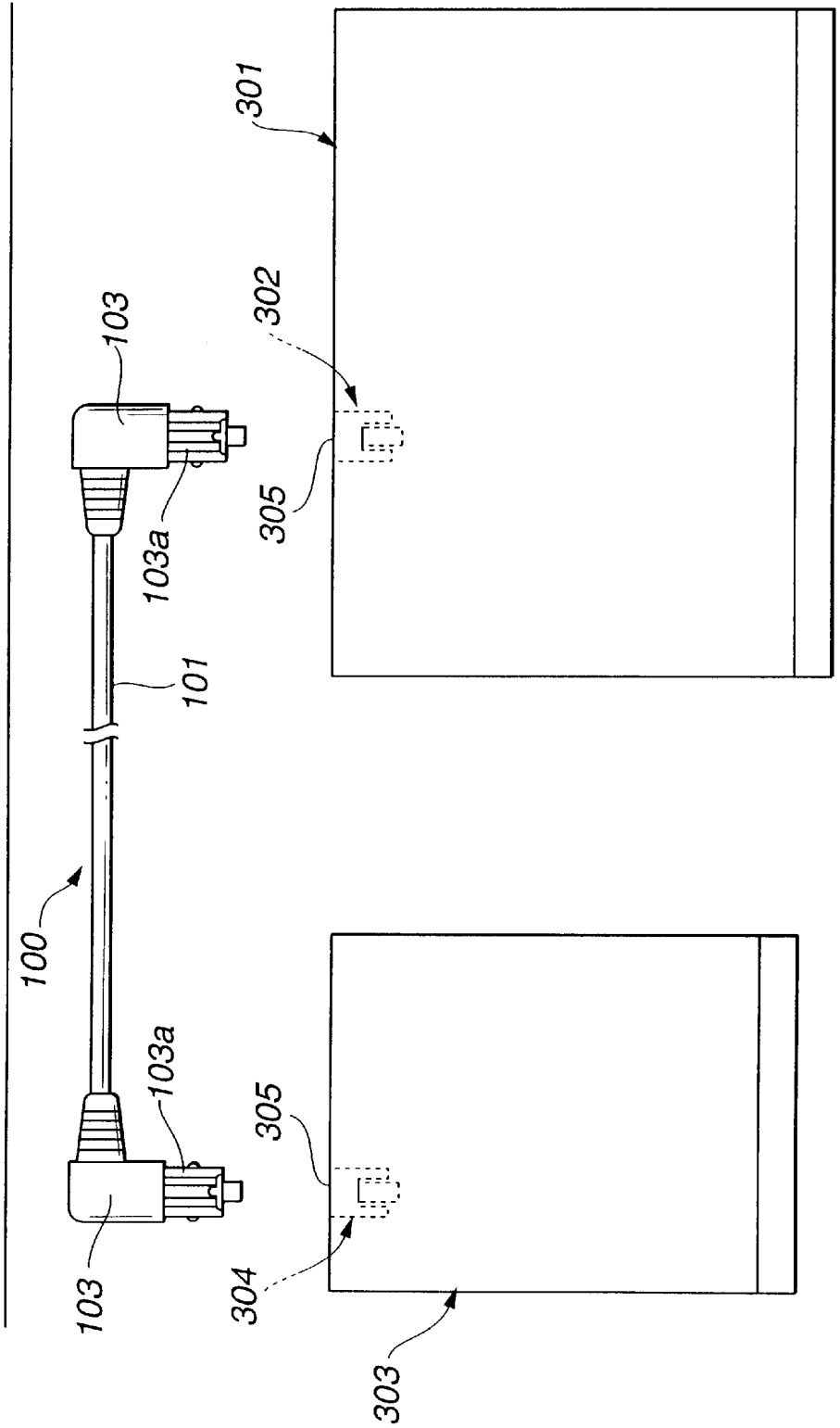
FIG. 12 is a general view showing a second embodiment of the plastic optical fiber cable according to the present invention.
Figure 13:
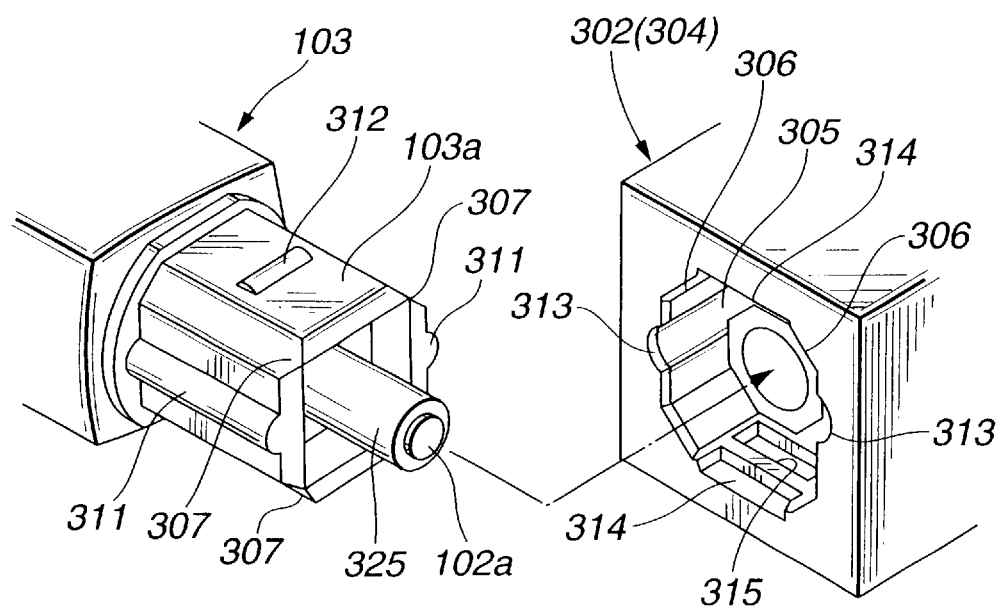
FIG. 13 is a perspective view showing an essential part of a plug of the second embodiment.
Figure 15A:
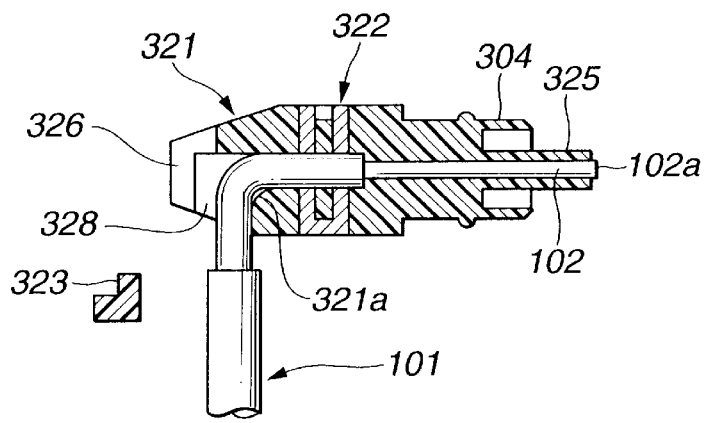
FIGS. 15A to 15C are cross-sectional views showing assembly process of the plug of FIG. 12.
Figure 15B:
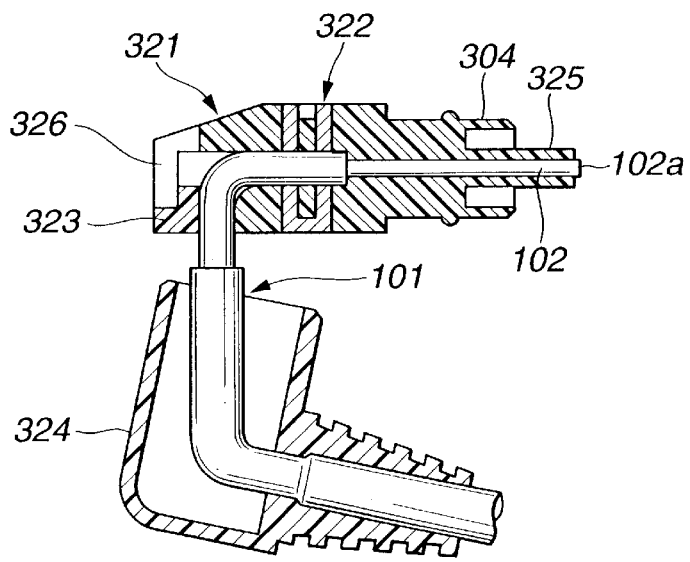
Figure 15C:
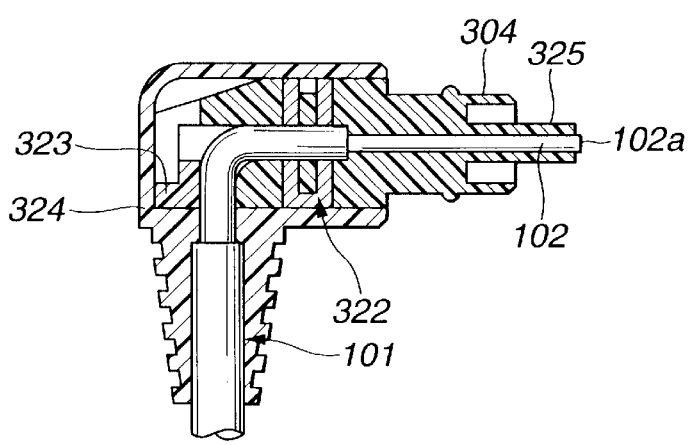

As shown in FIGS. 12, 13 and 15C, the plastic optical fiber connector 100 comprises an optical cable 101 and a pair of plugs 103 and 103. The basic construction of the second embodiment is the same as those of the first embodiment except that a shape and a structure of the plugs 103 and 103 are different from those of the first embodiment. That is, the optical cable 101 comprises a multi-fiber core 102 and first and second covering layers which cover an outer periphery of the multi-fiber core 102. The multi-fiber core 102 is formed by combining two hundreds and several tens of core fibers into a bundle of 1 mm diameter (1φ). Further, each of the core fibers is covered with cladding, and both end portion of the optical cable 101 are bent at an angle of about 90° by the plugs 103 and 103, respectively.

Each of the plugs 103 and 103 comprises a plug main body 321 which has a rectangular projecting portion 103a, a pair of insert guide projections 311 and a pair of stopper projections 312, a cable stopper member 322, a cable bent maintaining member 323 and a cover member 324. The plastic optical fiber connector 100 is arranged to connect an input side of an electronic device 301 and an output side of an electronic device 303 by inserting the input end portion side plug 103 to an input side jack 302 of the electronic device 301 and by inserting the output end portion side plug 103 to an output side jack 304 of the electronic device 303.

The plug main body 321 comprises a cable supporting portion 325 formed at a center portion of the rectangular projecting portion 103a, a cable inserting portion 326 through which an end of the multi-fiber core 102a of the optical cable 102 inserted to the cable supporting portion 325, a cable stopper installing portion 327 for installing the cable stopper portion 322, and a bent maintaining member installing portion 328 to which the cable bent maintaining member 323 is installed.

The assembly of the plugs 103 and 103 to the optical cable 101 is executed by the following steps.

Figure 14A:
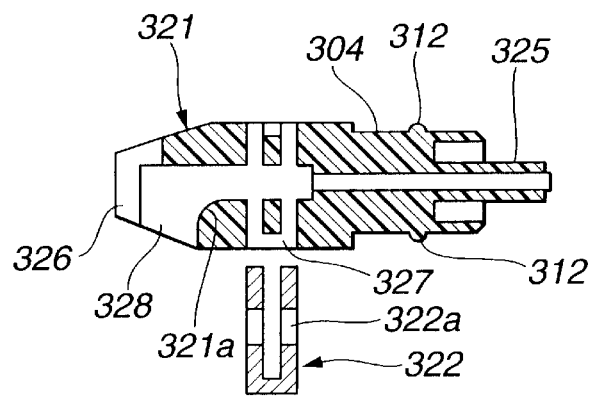
FIGS. 14A to 14D are cross-sectional views showing assembly process of the plug of FIG. 12.
Figure 14B:
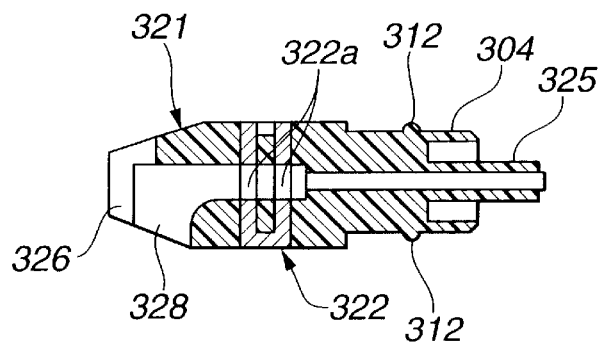
Figure 14C:
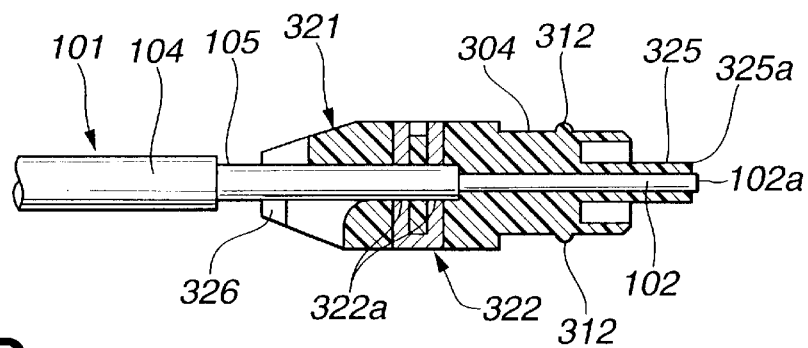
Figure 14D:
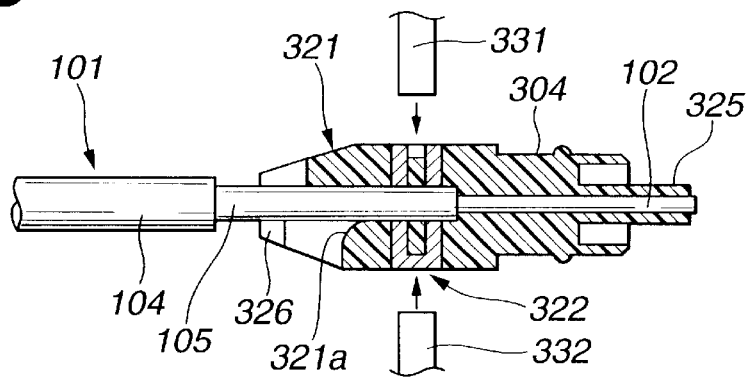

First, as shown in FIGS. 14A and 14B, a cable stopper member 322 of the plug main body 321 is installed to the stopper member installing portion 327. Next, as shown in FIG. 14C, the optical cable 101 is inserted from a back side of the plug main body 321, and the optical cable 101 is inserted to a cable insertion hole 322a provided to the cable stopper member 322. Thereafter, each of the input and output end portions 102a and 102b of the multi-fiber core 102 of the optical cable 101 is inserted to the cable supporting portion 325 so as to slightly project from a tip end surface 325a of the cable supporting portion 325. Further, as shown in FIG. 14D, the cable insertion hole 322a is pressingly deformed by pressing the cable stopper member 322 by means of a punch 331 and a die 332 so as to prevent the optical cable 101 from being detached from the plug main body 321.

Next, as shown in FIG. 15A, the optical cable 102 in the plug main body 321 is bent along a cable bent surface 321a provided in the plug main body 321 at about 3 mm in bent radius R. The optical cable 102 is maintained at a bent angle of 90° by installing a cable bent maintaining member 323 to the plug main body 321, as shown in FIG. 15B. A cover member 324 is installed to the plug main body 321, as shown in FIG. 15C.

By executing the above-mentioned assembly steps, the plugs 103 and 103 are installed to the optical cable 101, and the both end portions of the optical cable 101 are maintained at the bent angle of about 90°.

Even if the plug 103 is turned by 180° angle on the multi-fiber core 102 installed in the plug 103, the rectangular projecting portion 304 of the plug 103 is adjustably engaged with the recess portion 305 of the jack 302 while the insert guide projections 311 and 311 are fittingly engaged with the insert guide grooves 313 and 313. Therefore, the plug 103 is connected to the jack 302 in two states. However, in other states, that is, the plug 103 is turned by 90° angle from a connectable state, the insert guide projections 311 function to prevent the plug 103 from being connected with the jack 303.

Figure 16:
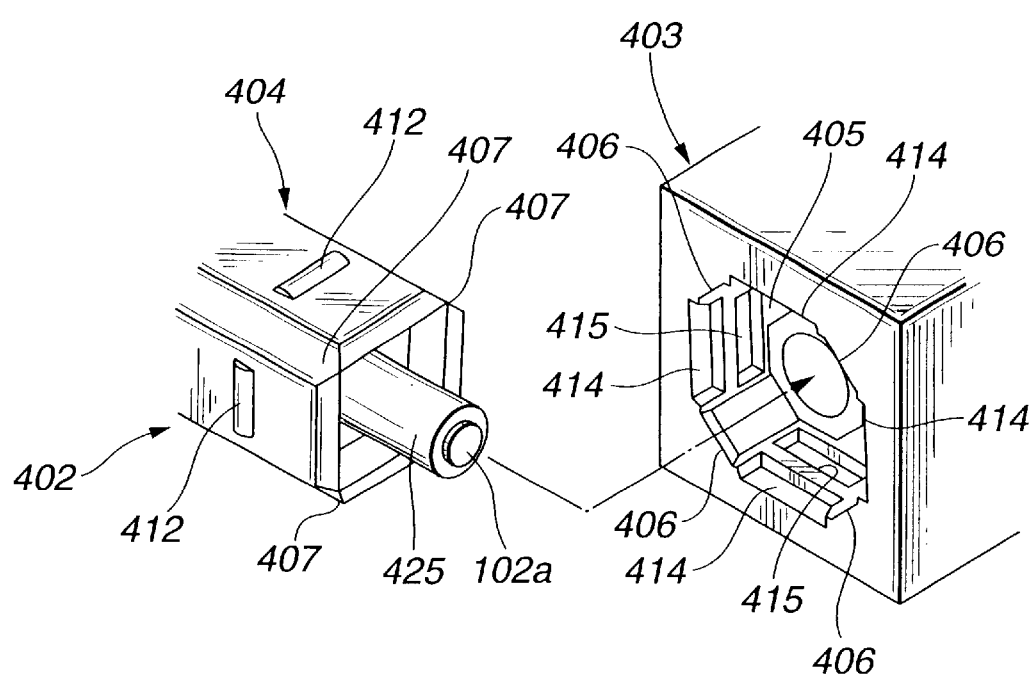
FIG. 16 is a perspective view showing a plug of the plastic optical fiber connector of a third embodiment according to the present invention.

Referring to FIG. 16, there is shown a third embodiment of the optical fiber connector according to the present invention. The construction of the third embodiment is basically the same as that of the second embodiment except that instead of the insert guide projections 311, stopper projections 412 are provided on the outer surfaces of the projecting portion 404. The optical fiber connector is arranged to have a rectangular shape as is similar to that of the second embodiment.

More specifically, four stopper projections 412 are provided on the four outer surfaces of the rectangular projecting portion 404, respectively. On the other hand, four stopper guide grooves 414 and four stopper engage grooves 415 are provided on four inner surfaces of a recess portion 405 of a jack 403, respectively. Accordingly, the plug 402 is engaged with the jack 403 even if the outer surfaces of the projection portion 404 face with any inner surfaces of the recess portion 405. The other construction of the third embodiment are the same as that of the first embodiment and therefore the explanation thereof will be omitted herein.

Figure 17:
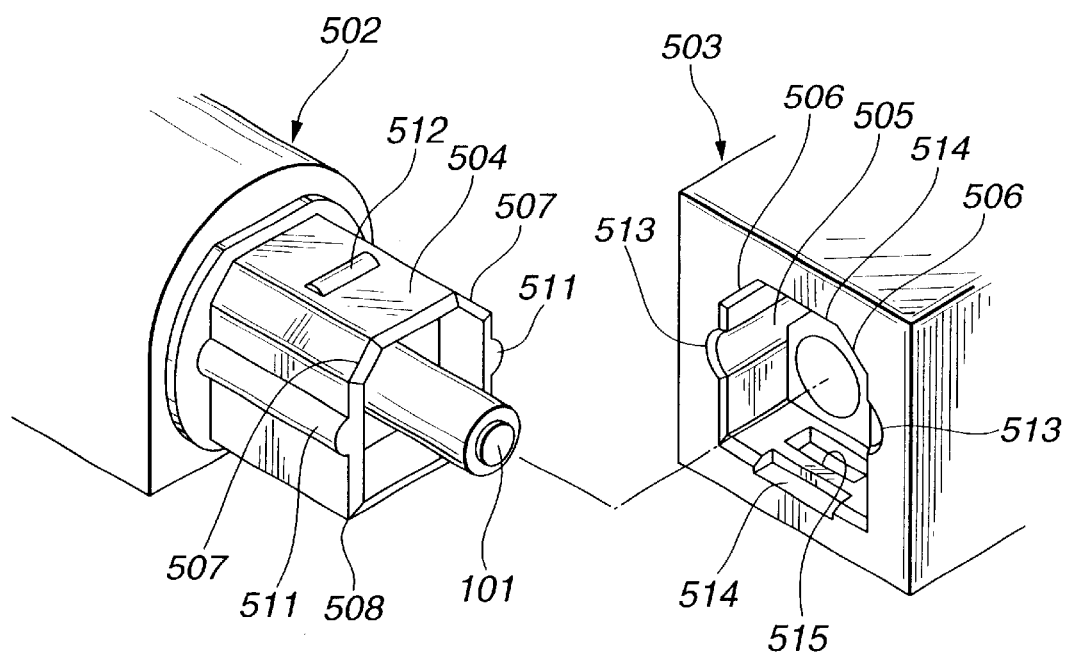
FIG. 17 is a perspective view showing an essential part of a plug of a conventional optical fiber connector.
Figure 18:
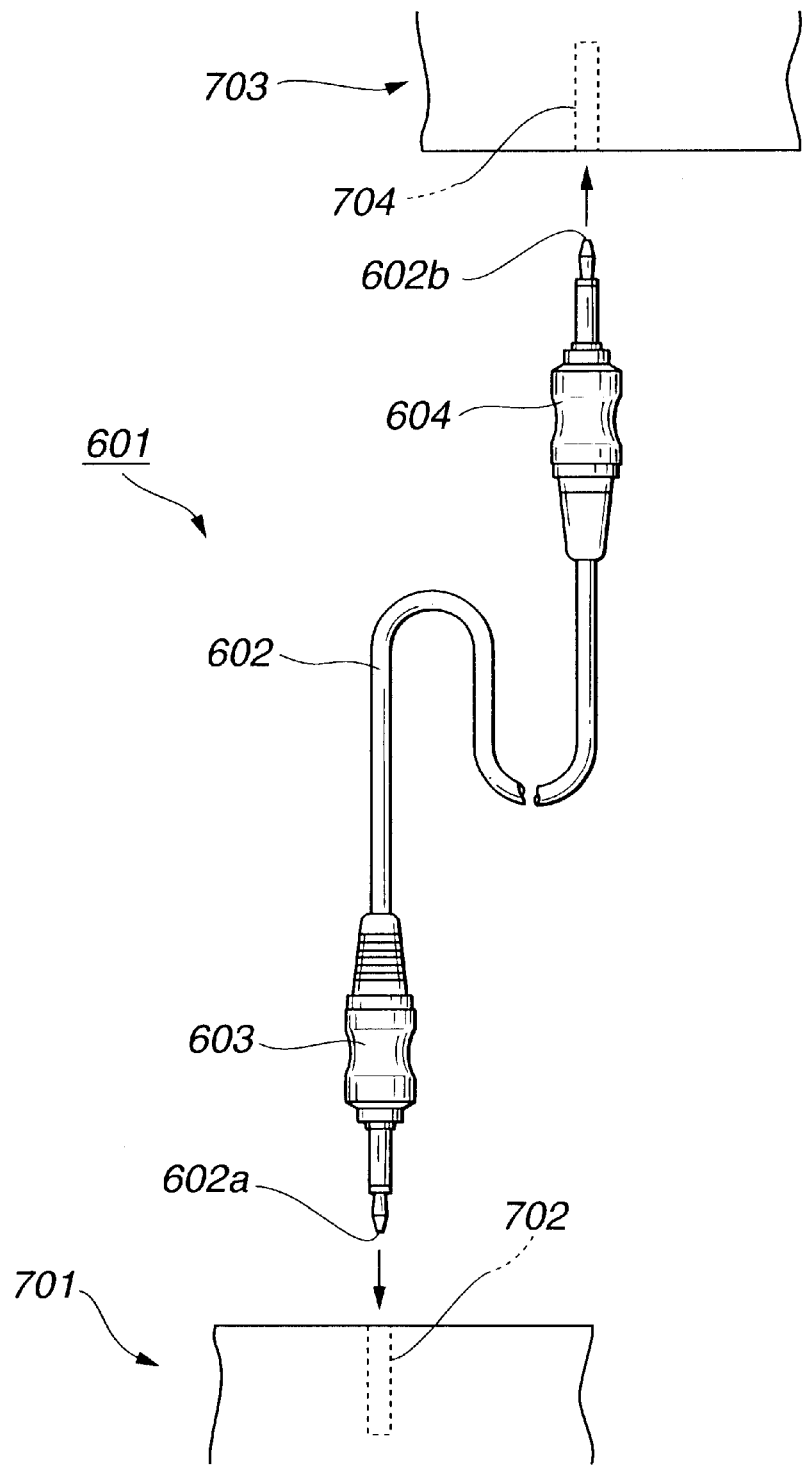
FIG. 18 is a general view showing a conventional optical fiber connector together with electronic devices connected thereby.
Figure 19:
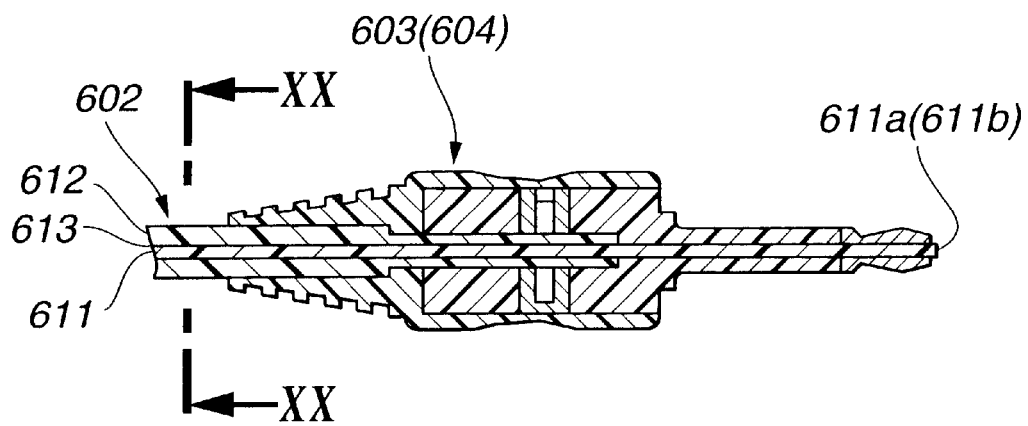
FIG. 19 is a cross-sectional view of a plug of the conventional optical fiber connector of FIG. 18.
Figure 20:
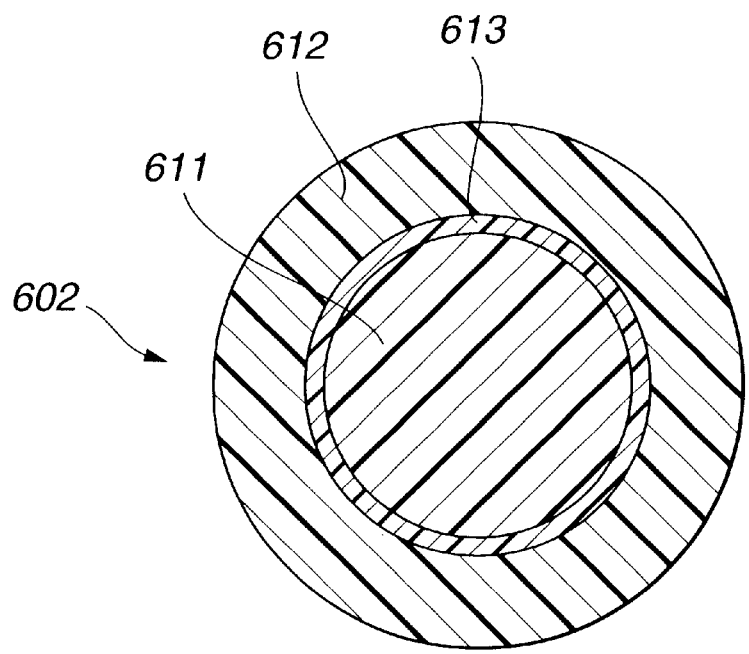
FIG. 20 is a cross-sectional view of an optical cable of FIG. 19 taken in the direction of arrows substantially taken along the line XX—XX of FIG. 19.
Figure 21:
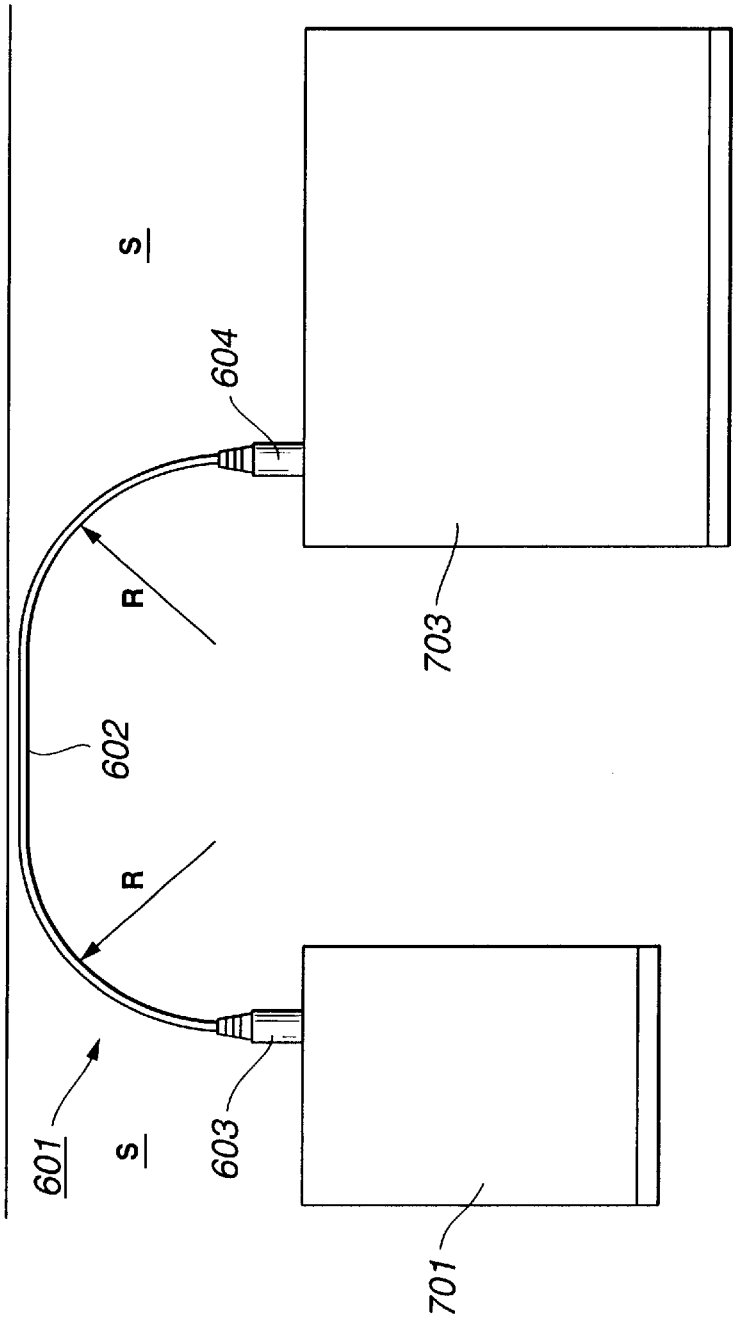
FIG. 21 is a general view showing a conventional plastic optical fiber connector connecting two electronic devices.

This arrangement of the third embodiment solves the problem of a conventional connector shown in FIG. 17. That is, the conventional connector of FIG. 17 is arranged such that a plug 502 can be engaged with a jack 503 only when the plug 502 is adjusted such that a pair of plug-insert avoiding portions 506 and 506 of the jack 503 are adjusted with a pair of cutout portions 507 and 507 of the plug 502. Accordingly, the conventional connector of FIG. 17 is very restricted in the degree of freedom as to connecting. In contrast to this, the third embodiment is arranged to improve this restriction of the conventional connector.

What is claimed is:

1. An optical fiber connector comprising:
   an optical cable employing a multi-fiber core constituted by a plurality of plastic fibers; and
   a pair of angled plugs installed to respective end portions of said optical cable, wherein each plug includes a plug main body having a straight through-channel formed therein for receiving the multi-fiber core of the optical cable straight thereinto, a cable stopper member inserted into the plug main body for retaining the cable, said cable thereafter being bent along a cable bent surface formed in the plug main body, and being retained in a bent position by a cable bent maintaining member, whereby each end portion of said optical cable is bent at an angle of about 90° inside respective ones of said pair of angled plugs.

2. The optical fiber connector as claimed in claim 1, wherein said plug has a rectangular projecting portion which is engaged with a rectangular recess portion of a jack of an electronic device.

3. The optical fiber connector as claimed in claim 2, wherein at least one of four corner portions of the rectangular recess portion is provided with a plug-insert avoiding portion, and four corner portions of the rectangular projecting portion are provided with cutout portions, respectively.

4. The optical fiber connector as claimed in claim 2, wherein a stopper projection is provided on each of four outer surfaces of the rectangular projecting portion, and a stopper engage groove is provided on each of four inner surfaces of the recess portion.

5. The optical fiber connector as claimed in claim 2, wherein two insert-guiding projections are provided opposite two surfaces of the rectangular projecting portion respectively, two stopper projections are provided on the other opposite two surfaces of the rectangular projecting portion respectively, two insert guiding grooves are provided on opposite two surface of the rectangular recess portion respectively, and two stopper receiving grooves are provided on the other opposite two surfaces of the rectangular recess portion respectively.

6. An optical fiber connector comprising: an optical cable having
   a multi-fiber core constituted by a plurality of plastic fibers, and
   a covering layer covering the multi-fiber core; and
   a pair of angled plugs installed on respective end portions of said optical cable, each plug includes a plug main body having a straight through-channel formed therein for receiving the multi-fiber core of the optical cable straight thereinto, a cable stopper member inserted into the plug main body, said cable thereafter being bent along a cable bent surface formed in the plug main body for retaining the cable, and being retained in a bent position by a cable bent maintaining member, whereby each of said angled pair of plugs maintain the respective end portions of said optical cable at a bent angle of about 90°.

* * * * *